US009215363B2

(12) United States Patent
Stavely et al.

(10) Patent No.: US 9,215,363 B2
(45) Date of Patent: Dec. 15, 2015

(54) IMPLEMENTING AUTOFOCUS IN AN IMAGE CAPTURE DEVICE WHILE COMPENSATING FOR MOVEMENT

(75) Inventors: Donald J. Stavely, Windsor, CO (US); Mark J. Bianchi, Ft. Collins, CO (US); Daniel M. Bloom, Loveland, CO (US); Charles E. Schinner, Windsor, CO (US); Kurt E. Spears, Ft. Collins, CO (US); Wilfred Brake, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1231 days.

(21) Appl. No.: 10/989,990

(22) Filed: Nov. 16, 2004

(65) Prior Publication Data
US 2006/0066744 A1 Mar. 30, 2006

Related U.S. Application Data

(60) Provisional application No. 60/614,310, filed on Sep. 29, 2004.

(51) Int. Cl.
*H04N 5/232* (2006.01)
*G03B 3/00* (2006.01)
*G03B 13/16* (2006.01)

(52) U.S. Cl.
CPC .............. *H04N 5/23212* (2013.01); *G03B 3/00* (2013.01); *G03B 13/16* (2013.01); *H04N 5/23248* (2013.01)

(58) Field of Classification Search
CPC .................................................. H04N 5/23248
USPC ................. 348/352, 220.1, 208.1, 155, 345, 348/208.12
See application file for complete search history.

(56) References Cited

U.S. PATENT DOCUMENTS

| | | | | |
|---|---|---|---|---|
| 5,031,049 A * | 7/1991 | Toyama et al. | ............... | 348/352 |
| 5,223,875 A * | 6/1993 | Yanagisawa | ..................... | 396/58 |
| 6,081,668 A * | 6/2000 | Furuyama et al. | ............... | 396/55 |
| 6,088,060 A * | 7/2000 | Suda et al. | .................... | 348/350 |
| 6,122,004 A * | 9/2000 | Hwang | .................... | 348/208.13 |
| 6,320,614 B1 * | 11/2001 | Kawashima | ............. | 348/211.99 |
| 6,385,398 B1 * | 5/2002 | Matsumoto | ..................... | 396/52 |
| 6,466,742 B1 * | 10/2002 | Baron | ............................. | 396/59 |
| 6,606,458 B2 * | 8/2003 | Umeda et al. | ................. | 396/110 |
| 6,707,937 B1 * | 3/2004 | Sobel et al. | ................... | 382/162 |
| 7,079,188 B2 * | 7/2006 | Shiraishi et al. | .............. | 348/350 |
| 7,162,151 B2 * | 1/2007 | Nonaka et al. | .................. | 396/52 |
| 7,180,043 B2 * | 2/2007 | Washisu | ..................... | 250/208.1 |
| 7,283,663 B2 * | 10/2007 | Sobel et al. | ................... | 382/162 |
| 7,333,634 B2 * | 2/2008 | McClanahan | ................. | 382/107 |
| 2003/0049027 A1 * | 3/2003 | Umeda et al. | ................... | 396/89 |
| 2003/0103141 A1 * | 6/2003 | Bechtel et al. | ................. | 348/148 |
| 2003/0169339 A1 * | 9/2003 | Allen et al. | .................... | 348/169 |
| 2004/0090551 A1 * | 5/2004 | Yata | ............................. | 348/354 |
| 2004/0190886 A1 * | 9/2004 | Tomita | ........................... | 396/55 |
| 2005/0041112 A1 * | 2/2005 | Stavely et al. | ............ | 348/208.14 |
| 2005/0052539 A1 * | 3/2005 | Stavely et al. | ............. | 348/211.4 |

FOREIGN PATENT DOCUMENTS

| | | |
|---|---|---|
| JP | 01175373 A | 11/1989 |
| JP | 04002281 A | 1/1992 |
| JP | 2003029132 A | 1/2003 |

* cited by examiner

*Primary Examiner* — Usman Khan
(74) *Attorney, Agent, or Firm* — Hewlett-Packard Patent Department

(57) ABSTRACT

A system and method for focusing an image capture device are disclosed. One embodiment is a method comprising moving an autofocus window in response to detected movement of the image capture device.

18 Claims, 6 Drawing Sheets

IMPLEMENTING AUTOFOCUS IN AN IMAGE CAPTURE DEVICE WHILE COMPENSATING FOR MOVEMENT

CROSS-REFERENCE TO RELATED APPLICATION

This application claims priority to copending U.S. provisional application entitled, "IMPLEMENTING AUTOFOCUS IN AN IMAGE CAPTURE DEVICE WHILE COMPENSATING FOR MOVEMENT," having Ser. No. 60/614,310, filed Sep. 29, 2004, which is entirely incorporated herein by reference.

BACKGROUND

Autofocus systems automatically focus a camera lens on a subject. Focusing the lens involves adjusting position of the lens components until a sharp image of the subject is projected onto an image sensor (e.g., film or a charge coupled device). One approach to achieving autofocus uses a form of sound navigation ranging which bounces a sound wave off of a target object. For example, a camera may compute the amount of time it takes for a reflected ultrasonic sound wave to return to the camera and then adjust the lens position accordingly. This use of sound has its limitations. For example, if a user is taking a picture from inside a tour bus with the windows closed, the sound waves may bounce off of the window instead of the target object (or subject), thereby causing the camera lens to focus incorrectly.

Another approach for implementing autofocus in digital cameras includes determining the distance to the subject by analyzing image content. The camera examines image data and adjusts the lens components back and forth searching for the best focus position based upon analysis of image data. Typically, a series of images corresponding to selected pixels from a center region, or from another window, of a charge coupled device (CCD) are taken at different camera lens positions.

A microprocessor in the camera examines the data from pixels in each of the images and determines the difference in intensity among the adjacent pixel data. If a scene is out of focus, data from adjacent pixels generally have very similar intensities. The microprocessor causes the camera lens to move, examines data from the CCD's selected pixels, and determines whether the difference in intensity between data of adjacent pixels has improved or become worse. The microprocessor then searches for a point where there is maximum intensity difference between data of adjacent pixels, aggregated over all of the pixels in the selected autofocus window. This aggregate is called a "focus metric." The peak of the focus metric over all of the images taken at different lens positions is then determined to be the point of best focus.

A problem with the above-described autofocus system can arise if a photographer's hand shakes while the photographer is trying to capture an image. Hand shake movement may cause high contrast scene information to move into and/or out of the edge of the autofocus window during the autofocus process. Hand shake movement may cause the focus metric to rise and fall due to the movement, resulting in a "false peak." As a result, the focus position of the camera lens occurs at a position that is not favorable for capturing an image that is properly focused on the subject.

Other types of camera movement may also cause poor image focus. For example, image capture may occur while the user is traveling in an automobile moving over a bumpy road.

SUMMARY

An embodiment for focusing an image capture device comprises identifying at least one direction of movement of the image capture device and shifting position of an autofocus window in a direction that is substantially opposite to the direction of the image capture device movement.

Another embodiment for focusing an image capture device comprises moving an autofocus window in response to detected movement of the image capture device.

Another embodiment for focusing an image capture device comprises capturing a first focus image when an autofocus lens is at a first focus position, the first focus image corresponding to an autofocus window that is directed towards a target object upon which the image capture device is to focus on; detecting movement of the image capture device, the movement occurring between capture of the first focus image and a second focus image; adjusting position of the autofocus window, the adjustment corresponding to the detected movement such that the target object remains substantially stationary within the autofocus window during the detected movement; and capturing the second focus image when the autofocus lens is at a second focus position.

BRIEF DESCRIPTION OF THE DRAWINGS

Autofocus by an image capture device is illustrated by way of example and not limited by the implementations illustrated in the following drawings. The components in the drawings are not necessarily to scale. Like reference numerals designate corresponding parts throughout the several views.

DETAILED DESCRIPTION

Figure 1:
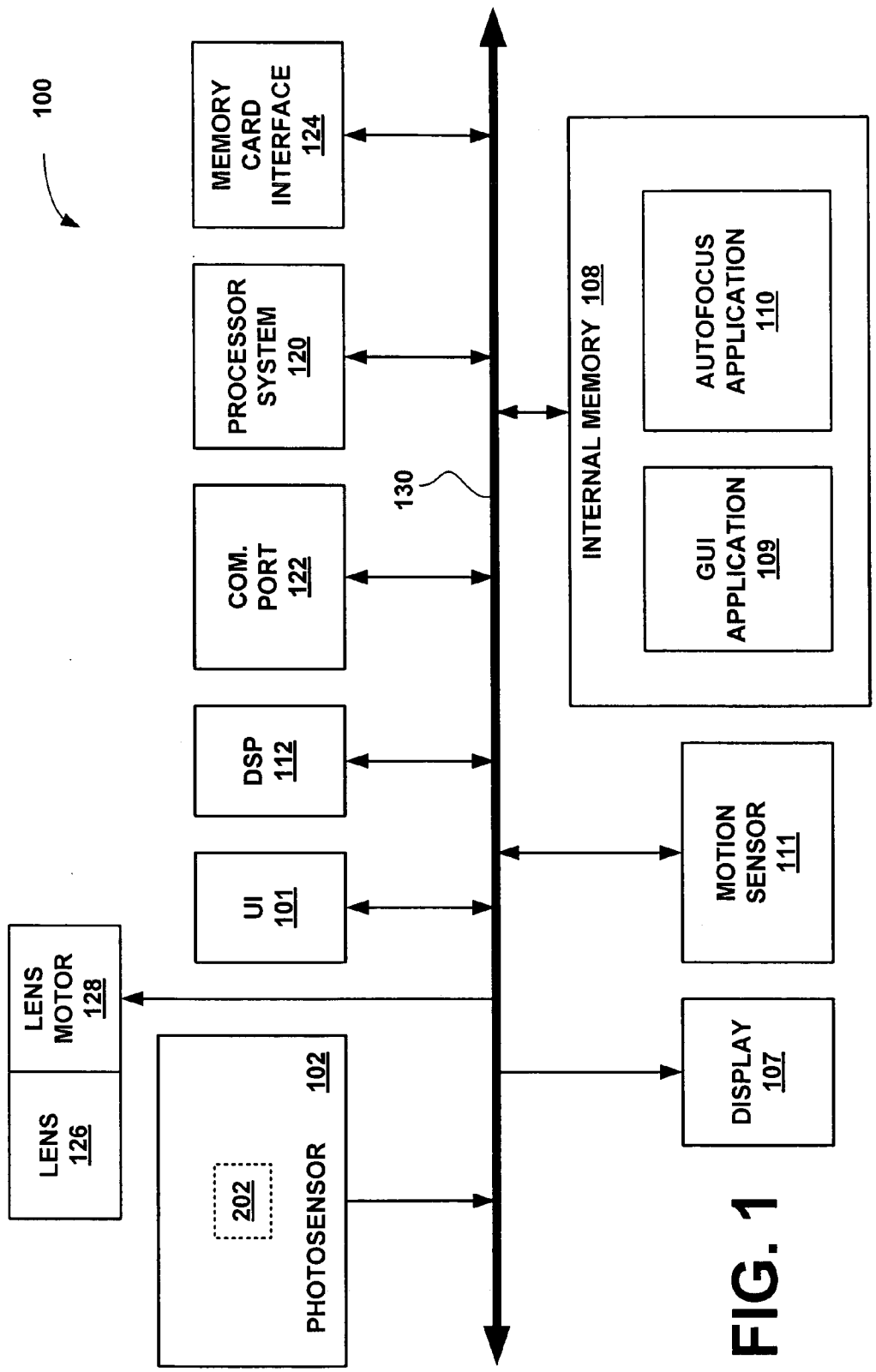
FIG. 1 is a block diagram depicting an example of components of a digital camera.

Embodiments apply to electronic image stabilization of an autofocus function of an image capture device, such as, but not limited to, a digital camera, a film-based camera with an electronic autofocus device, or a camcorder. In one exemplary embodiment, a first focus image is captured by exposing the image capture device's photosensor. An autofocus window, centered on a photosensor and initially directed towards a target object (through the lens of the image capture device), is determined. In other embodiments, the autofocus window may correspond to another location on the photosensor, or a plurality of autofocus windows may correspond to selected locations on the photosensor. Data from the pixels corresponding to the autofocus window are read and processed to determine a focus metric.

The above-described focus image is captured with the image capture device lens at a first focus position. The object of interest of the image may or may not be in focus when the first focus image is captured. (In all probability, the image will be out of focus.) As used herein, a focus position of the lens is the position of the lens, or the components therein, that would focus an object of interest on the image capture medium when the object of interest is at a corresponding distance.

Then, the image capture device lens is changed to a second focus position and a second focus image is captured. In the event that there is no movement of the image capture device between the time when the first focus image and second focus image are captured, data from the same pixels (used for the first autofocus window) will be used to determine a second focus metric.

However, motion or movement of the image capture device may have occurred between the time when the first focus image and second focus image are captured. Such movement may be caused by a variety of factors, such as movement of the hand of the user of the image capture device, windage, or vibrations caused by a moving vehicle in which the user is located (and presumably the image capture device).

In response to detected movement of the camera (such as small magnitude, high frequency movement due to "hand shake" or the like), the autofocus window determined from the second focus image is shifted in a direction opposite of the detected movement. That is, a different group of pixels are defined as the autofocus window, and data from that second group of pixels are read and processed to determine the second focus metric. Accordingly, a substantially stable or stationary autofocus window is defined with respect to the scene or subject being captured. In another embodiment wherein movement is determined based upon comparison of captured images, the determined movement may be used to adjust location of an autofocus window.

During the autofocus process, a series of focus metrics corresponding to selected pixels from the autofocus window are determined at different image capture device lens positions, the lens position corresponding to focus values for the image capture device. Using the detected movement between capture of the series of focus images, each of the autofocus windows are adjusted such that substantially stable or stationary autofocus window is defined for the series of captured focus images.

As a result, a region of the photosensor used to determine the autofocus metrics are determined from autofocus windows that are held substantially stationary (relative to the subject being captured) during the autofocus process. A substantially stable or stationary autofocus window reduces the effect of high-contrast objects moving in and out of the autofocus window, reduces false peaks in the focus metric, and improves the camera's ability to focus on a target object.

In one embodiment, focus images detected by the camera may be used to estimate camera movement. In another embodiment, other portions of the images captured by the photosensor, or the image from the entire photosensor, may be used to estimate camera movement. For example, image data from successively captured frames of the autofocus window are compared (e.g., correlated) to estimate the relative movement of the image content. The peak of a two-dimensional (X and Y) correlation function corresponds to the best estimate of image movement between the frames. Algorithms for generating such "motion vectors" from successive images are well understood as part of video compression algorithms such as MPEG (moving picture experts group).

In such embodiments, after movement is determined from successively captured images, pixels are selected to define autofocus windows that are substantially stable or stationary for the series of captured focus images. In other embodiments, the determined movement is used to define the autofocus window for subsequently captured focus images, such as the third focus image.

In various embodiments, movement may be detected using physical devices, such as, but not limited to, gyroscopes, accelerometers, or other motion sensing technologies. For example, two orthogonally-mounted rotation sensors may be used to sense and compensate for movement in both horizontal (yaw) and vertical (pitch) rotational directions.

FIG. 1 is a block diagram depicting exemplary components of an embodiment of an image capture device 100. The image capture device 100 includes a photo-sensor 102 for capturing images; a display screen 107 for displaying images; a memory 108 for storing firmware and/or captured image data; a digital signal processor for processing information received form photosensor 102; a processor system 120 for executing firmware stored in the memory 108, for manipulating image data and/or for performing other image capture device functions; user-input (UI) controls 101 for receiving user input; and one or more communication ports 122 for transferring image data to or from another device. In other embodiments, some of these components may not be used and/or other components not described herein may be present. For example, in a film-based image capture device, the display screen 107 may be omitted and a film handling means may be used to advance film such that a series of images may be captured on a roll of film.

The photosensor 102 may comprise, for example, a charge-coupled device (CCD) having a plurality of photo sensitive devices, referred to herein as pixels. Other embodiments may use other electronically based image capture sensors. A portion of the photosensor 102, used for capture of the entire image, is used to define one or more autofocus windows 202. In other embodiments, a relatively smaller photosensor 102 may be used to define one or more autofocus windows 202, such as an electronic autofocus system in a film-based camera. Autofocus windows 202 are defined by selecting a group of pixels from photosensor 102.

The UI controls 101 may include physical controls such as, for example, buttons, rocker switches, and/or a key pad for receiving user input. Alternatively, the display screen 107 may be a touch-sensitive device, and may thus display virtual controls for receiving user input. Yet another embodiment may implement the UI control functions through a menu system.

The memory 108, which may include a combination of volatile and non-volatile memory, may store a graphical user interface (GUI) application 109 and an autofocus application 110 (configured to shift the autofocus window 202 in a direction that is substantially opposite to the detected direction of the movement of the image capture device 100, as described herein, and/or configured to generate the autofocus control signal that causes a lens motor 128 to adjust focus of lens 126). These applications 109 and 110 may be executed by the processor system 120, which may be a general purpose or a custom-made processor configured to execute program code, depending upon the particular embodiment.

Each communication port 122 may comprise, for example, but not limited to, a serial port, a parallel port, a small computer system interface (SCSI), an infra-red (IR) interface, a wireless radio frequency (RF) interface, or a universal serial bus (USB) interface. The communication port 122 may be configured, for example, to enable the image capture device 100 to be coupled to a personal computer (PC) or a television.

The above-mentioned components of the image capture device 100 may be communicatively coupled via a local interface 130. Local interface 130 may comprise, in some embodiments, one or more buses or other wired or wireless connections. The local interface 130 may also include additional elements, which are omitted for brevity, such as, for example, controllers, buffers, drivers, repeaters, and/or receivers, to enable data transfer and communications between components of the image capture device 100.

In one embodiment, photosensor 102 is configured to sense an image corresponding to an object of interest. The object of interest is projected onto the photosensor 102 through the lens 126. In another embodiment, the object of interest is focused on a film-based medium through the lens 126. A photosensor 102 is then included for at least the autofocus functions used by the film-based image capture device embodiments.

Lens 126 is an adjustable-focus camera lens configured to focus an image of the object of interest onto the photosensor 102. Accordingly, components in the lens 126 are adjusted to focus the image of the object of interest onto the photosensor 102.

At least one autofocus window 202 is defined within a region of photosensor 102. The autofocus window 202 may be predefined during initialization of the autofocus process. That is, the group of pixels that are to comprise the autofocus window may be already selected or identified. These pixels provide image data for the focus image used by the various embodiments. Or, the autofocus window may be defined upon the initialization of the autofocus process based upon one or more design criteria.

Captured image data (corresponding to a focus image) from the autofocus window 202 is used to determine a desirable focus position for the lens 126, as described hereinbelow. When the components of the lens 126 are positioned in accordance with the desirable focus position, the object of interest projected onto the photosensor 102 through the lens 126 is in focus.

In embodiments employing motion sensors, at least one motion sensor 111 is configured to identify direction of movement of the image capture device 100. In addition to detecting the direction of camera movement, the motion sensor(s) 111 may also determine a magnitude (distance, velocity and/or acceleration) of camera movement. The motion sensor 111 may comprise, for example, but is not limited to, a gyroscope, an accelerometer, and/or any suitable motion sensing component.

In one embodiment, the processor system 120 is programmed (e.g., via the autofocus application 110) to shift the autofocus window 202 in a direction that is substantially opposite to the detected direction of the movement of the image capture device 100. The shifting of the autofocus window 202 is accomplished by selectively shifting the defined position of the autofocus window 202 across the plurality of pixels (not shown) that comprise the photosensor 102. That is, the pixels selected for the autofocus window may be changed (reselected or redefined) to capture a series of focus images which correspond to a target object, such as an object of interest or a selected portion of the object of interest, that is used to determine focus for image capture. Accordingly, the position of the autofocus window 202 is adjusted so that image data (corresponding to the captured focus images) of the target object substantially stationary within the autofocus window during camera movement occurring during the autofocus process.

The processor system 120 is programmed to focus the lens 126 based upon the image data (focus images) received from the autofocus window 202, as described in greater detail herein. The lens 126 may be automatically focused via a lens motor 128, or another suitable electromechanical devices, responsive to autofocus control signals generated by the processor system 120.

Figure 2A:
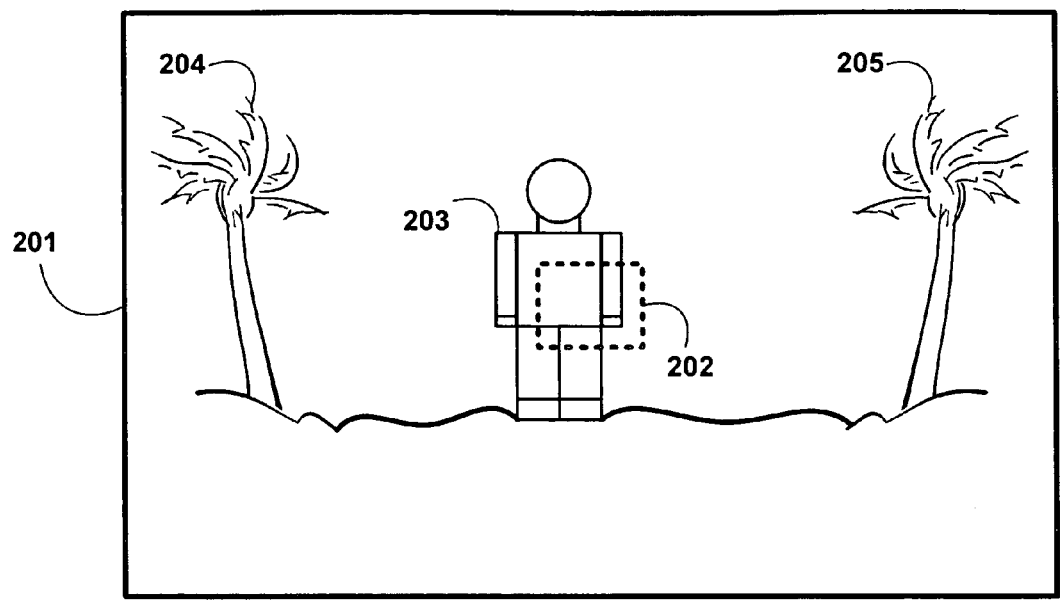
FIGS. 2A-2C depict an example of how the camera depicted in FIG. 1 remains focused on a target object while the camera is shaking.
Figure 2B:
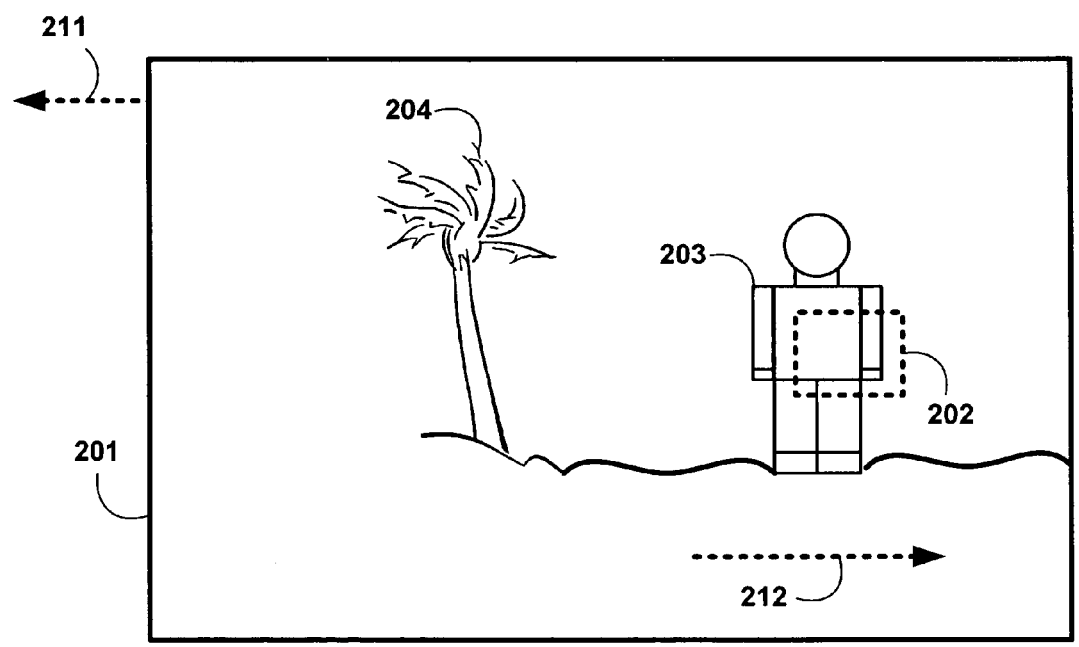
Figure 2C:
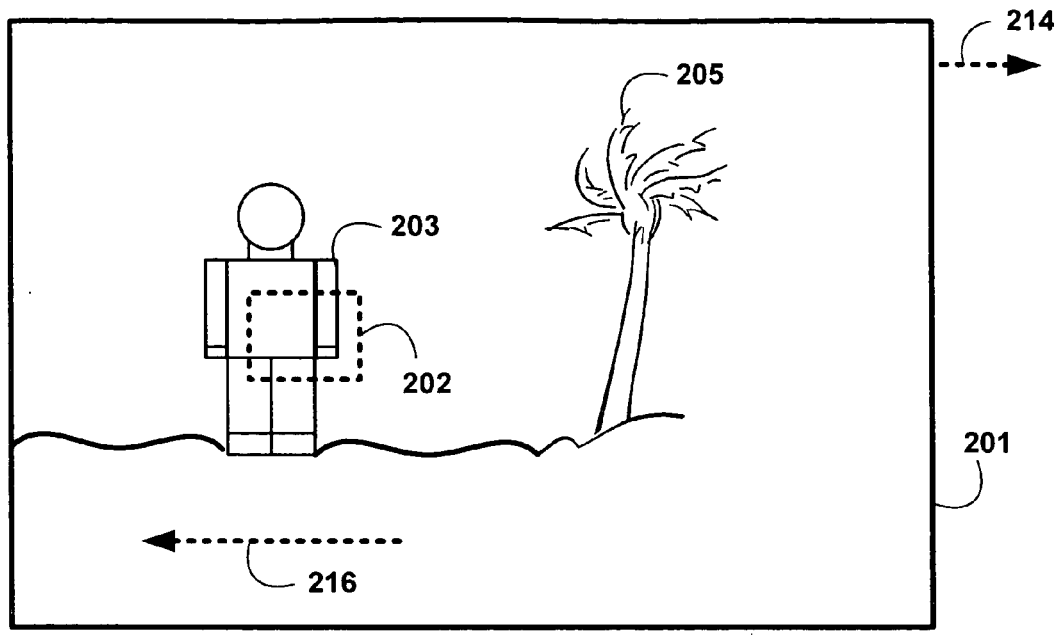

FIGS. 2A-2C depict an example of how the image capture device 100 (FIG. 1) focuses on a target object while the image capture device 100 is moving (e.g., due to unintentional movement of the photographer's hand). An image capture region 201 of the camera photosensor 102 (FIG. 1) includes an autofocus window 202. In this example, object images appearing in the image capture region 201 include a target object 203, which may be all of, or a portion of, the object of interest, and other objects 204 and 205. The target object 203 is the object of interest, or a portion of the object of interest, for which autofocus is desired.

FIG. 2A shows an exemplary field of view detected by photosensor 102. Autofocus window 202 is initially located at a predefined position on the photosensor 102. In this illustrative embodiment, autofocus window 202 is initially centered within image capture region 201. It is assumed that the target object 203 in the field of view is to be the object that is to be focused. Thus, the user of the image capture device 100 directs the lens 126 (FIG. 1) towards the target object 203. The autofocus process is initiated, in some embodiments, when the shutter button is partially depressed.

With reference to FIG. 2B, as the view field moves in a direction 211 (e.g., caused by yaw movement of the image capture device 100 (FIG. 1) in this illustrative example), the image capture region 201 also moves in the direction 211 relative to the target object 203. In response to the camera's movement in the illustrated yaw direction 211, the position of the autofocus window 202 is adjusted in an opposite direction 212. The repositioning of the autofocus window 202 may either correspond to the magnitude of the movement of the image capture region 201, or a fraction thereof, depending upon the embodiment or the circumstances of image capture. As a result, the target object 203 that is initially in the autofocus window 202 remains in the autofocus window 202 when a subsequent focus image is captured during the movement of the image capture device 100. Other portions of the object 204 remain out of the autofocus window 202. Accordingly, the portion of the target object 203 used to compute focus position of lens 126 (FIG. 1) remains substantially fixed on the target object 203 during the autofocus process.

With reference to FIG. 2C, as the image capture device 100 (FIG. 1) moves in the direction 214, the image capture region 201 also moves in the direction 214. In response to the image's movement in the direction 214, the autofocus window 202 again moves in an opposite direction 216. As a result, the target object 203 remains in the autofocus window 202. In this manner, the target object 203 used for the autofocus process remains in the autofocus window 202.

Although FIGS. 2A-2C described adjustments made to compensate for horizontal camera movements (and/or yaw), similar adjustments may also be made responsive for vertical camera movements (and/or pitch), and or for a combination of horizontal and vertical movement (and/or yaw and pitch). For example, in response to the image's movement in an upward direction due to pitch movement of the image capture device 100, the autofocus window 202 may be moved in a downward direction relative to the image capture region 201.

Figure 3:
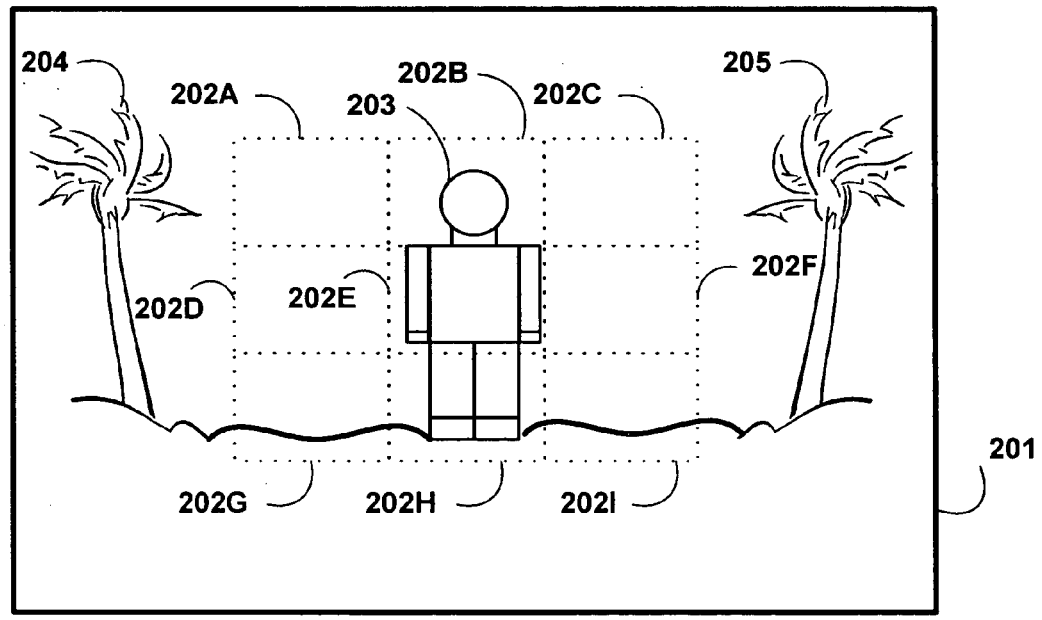
FIG. 3 depicts an example of multiple autofocus windows that may be implemented by the camera shown in FIG. 1.
Figure 5:
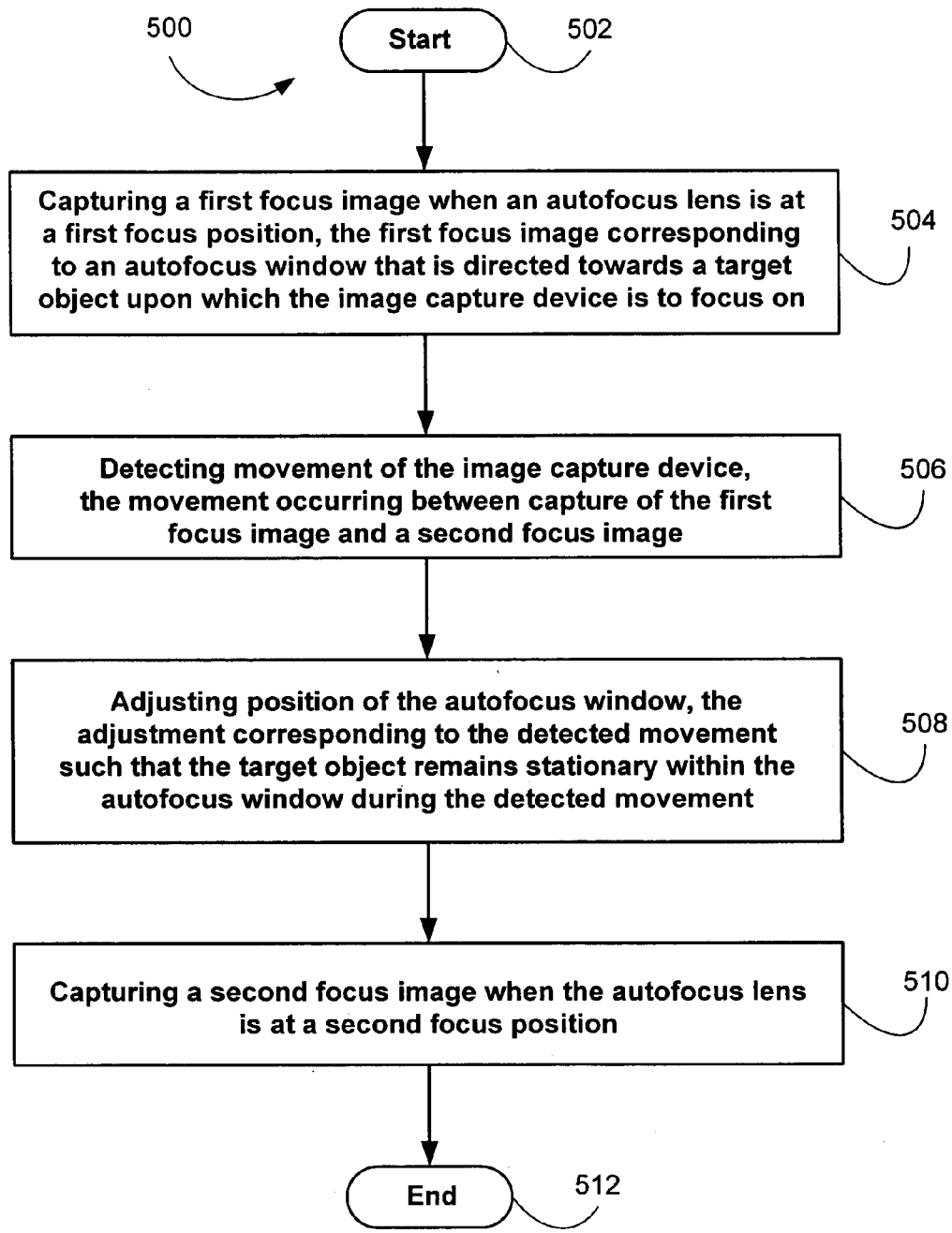
FIGS. 5-7 are flow charts of various embodiments for focusing an image capture device.

FIG. 3 illustrates that the image capture region 201 of the image capture device 100 (FIG. 1) may include a plurality of autofocus windows 202 A-I. The use of multiple autofocus windows 202 A-I covering different positions within image capture widow 201 is referred to herein as "a multi-zone autofocus" embodiment. In some embodiments, a plurality of autofocus windows 202 A-I may be shifted responsive to image capture device 100 movement to enable focus based upon a stable position of a selected one of the autofocus windows 202 A-I. In one embodiment, the autofocus window 202 corresponding to the closest portion of a target object to the image capture device 100 is used as a basis for determining a focus distance for focusing the lens 126 (FIG. 1). Other embodiments may include algorithms or manual selection of one of the plurality of autofocus windows 202 A-I to be used as the basis for determining the focus of the lens 126. Although nine autofocus windows 202 A-I are shown in FIG. 5, other embodiments may include fewer or additional autofocus windows.

In FIG. 3, the plurality of autofocus windows 202 A-I are shown adjacent to each other. In other embodiments, the autofocus windows 202 A-I may be separated from each other, and/or may overlap each other. Furthermore, is some embodiments, the number of the plurality of autofocus windows 202 may be different. For example, the number of autofocus windows 202 may vary when operating in different image capture modes. And, in some embodiments where the number of autofocus windows varies, the number of autofocus windows 202 may be selectable.

Figure 4:
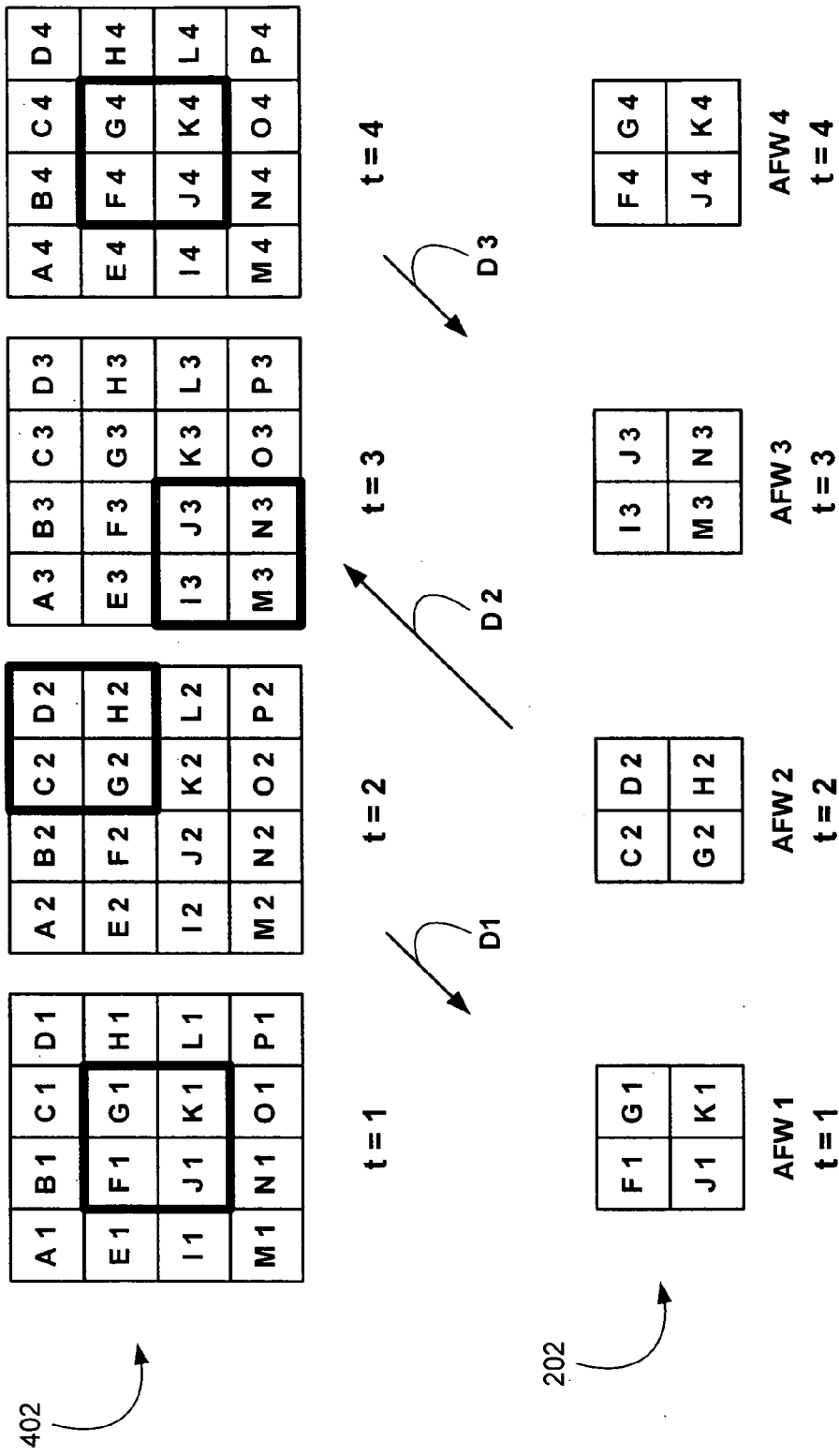
FIG. 4 is a simplified illustrative example depicting a sequence of autofocus windows (AFW 1, AFW 2, AFW 3, and AFW 4) captured during movement of the image capture device.

As noted above in the simplified illustrative example of FIG. 4, the location of an autofocus window 202 (FIG. 1) may be shifted by selecting a new set of corresponding pixels for which a focus metric is to be calculated. The repositioning of the autofocus window 202 may either correspond to the magnitude of the movement of the image capture region 201 (FIGS. 2A-2C), or a fraction thereof, depending upon the embodiment and/or the circumstances of image capture. In one embodiment, the autofocus window 202 is shifted relative to the image capture region 201 only if the movement of the image capture device 100 (FIG. 1) is determined to correspond to hand-shake type movement (e.g., small movements in different directions). Furthermore, the autofocus window 202 may be re-centered within the image capture region 201 if it is determined that the movements of the image capture device 100 do not correspond to hand-shake type movements (e.g., the image capture device 100 is moving a relatively long distance). Alternatively, frequency of the detected movement may be used to discriminate between intended movement (such as when following a moving subject) and unintended movement (hand shake). The autofocus window 202 may be slowly but continuously moving back toward the center of the image capture region 201, while still following the quicker movement on the image.

In one embodiment, image data corresponding to the shifted autofocus window 202 is analyzed to determine above-described focus metric, thereby determining a desired focus position for the lens 126 (FIG. 1). For example, a microprocessor in the image capture device 100 examines an image corresponding to the shifted autofocus window 202 to determine a focus metric. The lens 126 is then focused based upon the focus metric determined from the shifted autofocus window 202. After focusing the lens 126, an image corresponding to the image capture region 201 is captured.

In one embodiment, a sequentially captured plurality of focus images corresponding to a plurality of shifted autofocus windows 202 and a plurality of lens 126 positions may be analyzed. For example, a photographer may press the camera's exposure button half-way down and hold it at this position to initiate the autofocus process. The lens motor 128 moves the lens 126 (FIG. 1) incrementally and repetitively as images are exposed and read, such that the autofocus window 202 is shifted responsive to camera movement. As a result, focus images corresponding to a plurality of shifted autofocus windows 202 and a plurality of lens 126 positions are sequentially captured. A focus metric, in one embodiment, is computed for each of the plurality of shifted autofocus windows 202 based on the overall spatial contrast (e.g., sharpness) of the respective image. The lens position corresponding to the highest focus metric may then be selected to determine the desired focus position.

An alternative embodiment of a lens control algorithm, the autofocus application 110 (FIG. 1), may permit an overstep of the optimum lens focus position and may then back-step the lens 126 to such focus position. When the desired focus position is attained, an LED (light emitting diode) display or other indication of correct focus indicates to the photographer that the camera is ready to take the picture (i.e., that the lens 126 is properly focused). The photographer may then fully depress the exposure button to capture a desired image.

Autofocus may be implemented by the image capture device 100 (FIG. 1) by analysis of focus image data captured by the autofocus window(s). A first focus image and a second focus image are captured during the autofocus process, wherein the captured focus images correspond to the target object that the autofocus window 202 is directed at. For example, the first focus image may be captured while the lens 126 is at a first focus position and the second focus image may be captured while the lens 126 is at a second focus position.

During the autofocus process, the focus of the lens 126 is adjusted such that a sequential plurality of focus images from the autofocus window are captured and analyzed. For example, in one embodiment, a first focus image and the second focus image captured from the autofocus window 202 are analyzed to determine a focus position for a lens 126 by comparison of a determined focus metric. In one embodiment, a focus metric is computed for each focus image on its overall spatial contrast (e.g., sharpness). As an example, but not limited to, a focus metric may be computed from the sum of absolute differences between data of adjacent pixels in the autofocus window 202 (wherein the adjacency may be in a horizontal an/or a vertical orientation). Alternatively, a sum of the squared differences could be used. Other embodiments use other known types of focus metrics. In another embodiment, focus metrics may be interpolated to determine an intermediate lens focus position. It is appreciated that any suitable focus metric may be utilized. The position of lens 126 that has the corresponding highest focus metric may then be selected as the desired focus. That is, the lens position which provides the desired focus is based upon the plurality of determined focus metrics. Once the focus metric corresponding to the desired focus is determined, lens positioning means are operated, based upon autofocus signals from the processor, such that the lens position is adjusted to the desired corresponding focus.

In some embodiments, it is not necessary or practical to move the lens 126 through every possible focus position to determine the absolute peak of the focus metric. For example, an autofocus algorithm may search only in the vicinity of the previous exposure for a "local peak." Alternatively, an autofocus algorithm may start at focus position that corresponds to an object of interest at infinity and move forward to the first peak. Or, the autofocus algorithm may start at a focus position that corresponds to a close-up object of interest and move back to the first peak.

As noted above, defining a plurality of autofocus windows 202 A-I better enables the image capture device 100 to focus. For example, there may be multiple objects of interest and distant surroundings, or several possible subjects of interest at different distances, or a small portion of the object of interest may be within the field of view of the autofocus windows 202 A-I. Thus, in a single autofocus window 202 embodiment, the single autofocus windows 202 A-I may not be directed toward the intended target object. Therefore, a plurality of focus windows 202 A-I provide for focusing on an intended object of interest in such situations. Focus can be determined from a plurality of autofocus windows 202 A-I by selecting the autofocus window having the highest magnitude peak focus metric in one exemplary embodiment. This peak focus metric will likely be different from a peak focus metric corresponding to the entire combination of autofocus windows 202 A-I. In other words, by implementing a plurality of autofocus windows, a subject's surroundings are less likely to bias the focus of the lens 126.

In embodiments employing a plurality of autofocus windows, image capture device movement is detected and the autofocus windows 202 A-I are shifted (relative to the image capture region 201) in a direction that is opposite to the direction of image capture device movement. The repositioning of the autofocus windows 202 A-I may either correspond to the magnitude of the movement of the image capture region 201 A-I, or a fraction thereof, depending upon the embodiment or the circumstances of image capture.

Focus image data captured by the shifted autofocus windows 202 A-I are then analyzed (e.g., based on the sharpness of their content) to determine a desired focus for the lens 126 (FIG. 1). The lens 126 is then focused based upon focus metric data from a selected one of the shifted autofocus windows 202 A-I. Then, an image corresponding to the image capture region 201 is captured. For example, the lens 126 may be focused on the closest object in the field of view, as detected by one or more of the autofocus windows 202 A-I.

FIG. 4 is a simplified illustrative example depicting a sequence of autofocus windows (AFW 1, AFW 2, AFW 3, and AFW 4) captured during movement of the image capture device 100 (FIG. 1). For convenience of describing the autofocus windows AFW 1, AFW 2, AFW 3, and AFW 4, a 4×4 matrix of pixels 402 of photosensor 102 (FIG. 1) is illustrated. Also, for convenience, the size of autofocus windows AFW 1-4 is a 2×2 matrix. It is appreciated that the photosensor 102 has many more pixels than illustrated in FIG. 4, and that an autofocus window 202 may have any suitable number of pixels in an m×n matrix of pixels that define the autofocus window 202.

At a first time (t=1), autofocus window A 1 is centered in the 4×4 matrix of pixels 402 (for purposes of this illustrative example). Accordingly, the simplified exemplary autofocus window AFW 1 includes the four pixels F1, G1, J1 and K1. Here, the referencing letter of a pixel (A-P) identifies the pixel in the 4×4 matrix 402 for convenience. The referencing number of the pixel (here the number "1") indicates the first time, t=1, when a focus image is captured.

At the first time, the light detected by the four pixels F1, G1, J1 and K1 of autofocus window AFW 1 is read. That is, light information from the four pixels F1, G1, J1 and K1 of autofocus window AFW 1 is retrieved and processed into image data. The image data that is read from the four pixels F1, G1, J1 and K1 of autofocus window AFW 1 corresponds to a focus image.

During the time between the first time (t=1) and a second time (t=2), image capture device movement is detected by motion sensor 111 (FIG. 1), or is determined by analysis of image data in other embodiments. In this simplified illustrative example, the detected movement is downward and to the left (aligned diagonally with the pixels A-P, and having a magnitude of movement equal to the diagonal length of a pixel), as denoted by direction arrow D1.

Given the detected movement D1, the autofocus application 110 (FIG. 1) determines that autofocus window AFW 1 should be redefined. Based upon information corresponding to the detected movement D1, pixels C2, D2, G2 and H2 are selected as the autofocus window AFW 2 (where the number "2" corresponds to the second time, t=2). Thus, the autofocus window 202 has shifted in position from AFW 1 to AFW 2 in response to the detected movement, resulting in a substantially stable or stationary autofocus window 202. Here, the difference between the first location AFW 1 and the second location AFW 2 corresponds to a direction that is substantially opposite to the detected movement D1 of the image capture device 100. Accordingly, when the autofocus window 202 is directed at a target object, such as an object of interest or a selected portion of the object of interest, a second captured focus image which corresponds to the same target object as the first focus image.

During the time between the second time (t=2) and a third time (t=3), image capture device movement is again detected by motion sensor 111 (FIG. 1), or is determined by analysis of image data in other embodiments. In this simplified illustrative example, the detected movement is upward and to the right, as denoted by direction arrow D2. Furthermore, for the purposes of this example, the movement between the times t=2 and t=3 is assumed to be twice the movement of the above-described movement between the times t=1 and t=2 (denoted by direction arrow D1).

Given the detected movement D2, the autofocus application 110 (FIG. 1) determines that autofocus window AFW 2 should be redefined. Based upon information corresponding to the detected movement D2, pixels I3, J3, M3 and N3 are selected as the autofocus window AFW 3 (where the number "3" corresponds to the second time, t=3). Thus, the autofocus window 202 has shifted in position from AFW 2 to AFW 3 in response to the detected movement D2, resulting in a substantially stable or stationary autofocus window 202. Accordingly, when the autofocus window 202 is directed at a target object, such as an object of interest or a selected portion of the object of interest, a third captured focus image which corresponds to the same target object as the first and second focus images.

Again, the difference between the second location AFW 2 and the third location AFW 3 corresponds to a direction that is substantially opposite to the detected movement D2 of the image capture device 100. Furthermore, it is appreciated that since the detected movement D2 was twice the detected movement D1 in this simplified illustrative example, the shifting of the autofocus window 202 for AFW 2 to AFW 2 was twice as far as the shifting of the autofocus window 202 for AFW 1 to AFW 2.

During the time between the third time (t=3) and a fourth time (t=4), image capture device movement is again detected by motion sensor 111 (FIG. 1), or is determined by analysis of image data in other embodiments. In this simplified illustrative example, the detected movement is upward and to the right, as denoted by direction arrow D3. Furthermore, for the purposes of this example, the movement between the times t=3 and t=4 is assumed to be similar to the movement of the above-described movement between the times t=1 and t=2 (denoted by direction arrow D1).

Given the detected movement D3, the autofocus application 110 (FIG. 1) determines that autofocus window AFW 3 should be redefined. Based upon information corresponding to the detected movement D3, pixels F4, G4, J4 and K4 are selected as the autofocus window AFW 4 (where the number "4" corresponds to the second time, t=4). Thus, the autofocus window 202 has shifted in position from AFW 3 to AFW 4 in response to the detected movement D3, resulting in a substantially stable or stationary autofocus window 202. Accordingly, when the autofocus window 202 is directed at a target object, such as an object of interest or a selected portion of the object of interest, a fourth captured focus image which corresponds to the same target object as the first, second and third focus images.

In alternative embodiments, image data for a group of pixels covering a region greater than a defined autofocus window may be captured and saved or buffered. In the simplified illustrative example of FIG. 4, information from all of the pixels A-P may be saved or buffered. After processing of information corresponding to the detected movement is completed and the second autofocus window (for example, AFW 2) is determined, the group of pixels defined for the second auto focus window is then retrieved for processing. Thus, all of the detected movement between the time of the capture of successive autofocus windows may be accounted for.

In yet another embodiment, after processing of information corresponding to the detected movement is completed, that information may be used to define a third autofocus window. Thus, the detected movement is used to define the location of not the immediately following autofocus window, but rather, is used to define a subsequent autofocus window. For example, the detected movement D1 in the above simplified illustrative example of FIG. 4 may be used to determined the third autofocus window AFW 3.

Because pixels are discrete components sensing light incident on a discrete region of photosensor 102, it is appreciated that redefining pixels to adjust position of the autofocus window 202 may also introduce some small amount of error because the detected movement direction and/or magnitude does not exactly correspond to pixel size and/or alignment. For example, in the simplified example of FIG. 4, the detected movements D1, D2 and D3 were illustrated and described as being diagonally aligned with the pixels A-P. Also, the magnitude of movement D1, D2 and D3 were described and illustrated as being a multiple of the diagonal length of a pixel. Thus, the target object is exactly aligned from one autofocus window to the next autofocus window because the detected movement direction and magnitude exactly corresponds to pixel size and alignment.

However, in the event that the direction of detected movement and/or the magnitude of movement was different than illustrated in FIG. 4 (the detected movement direction and/or magnitude does not exactly correspond to pixel size and/or alignment), the target object may not be exactly aligned from one autofocus window to the next autofocus window. For example, suppose the magnitude of detected movement in the above-described determination of autofocus windows AFW 1 and AFW 2 was only two-thirds of the diagonal length of a pixel.

One exemplary embodiment defines an autofocus window that has the closest fit to the detected movement direction and/or magnitude. That is, this exemplary embodiment defines an autofocus window that provides the largest corresponding area of coverage to the detected movement. This embodiment would define the autofocus window as AFW 2 since the exemplary movement magnitude of two-thirds of the diagonal length of a pixel results in the autofocus window AFW 2 providing the largest corresponding area of coverage to the detected movement. However, suppose the magnitude of detected movement in the above-described determination of autofocus windows AFW 1 and AFW 2 was only one-third of the diagonal length of a pixel. In this situation, the exemplary embodiment would define the autofocus window as AFW 1 since the exemplary movement magnitude of one-third of the diagonal length of a pixel results in the autofocus window AFW 1 providing the largest corresponding area of coverage to the detected movement.

Accordingly, in the above described example (and in other situations where the detected magnitude and/or direction of movement is not exactly equal to the size and/or alignment of a the pixels), the target object would substantially remain stationary because the exemplary embodiment is defining an autofocus window having the best fit (greatest corresponding area of coverage) to the detected magnitude and/or direction of movement.

If an autofocus window comprises a relatively large number of pixels, the variations between pixel size and the detected direction and/or magnitude of movement may be accounted for with less error. That is, the autofocus windows may moved in a direction and/or magnitude that substantially corresponds to the detected movement because a greater number of pixels provides for greater resolution between detected movement and redefined autofocus windows. It is appreciated that a variety of embodiments may use suitable algorithms that provide a desirable closest fit to the detected direction and/or magnitude of movement such that a desirable autofocus window is defined. Accordingly, the target object would substantially remain stationary in successively defined autofocus windows.

It is appreciated that a period of time is required for image processing (photosensor exposure, reading the focus image data, determining position of the autofocus window and processing image information for an autofocus window). Furthermore, a period of time may be required for detecting movement, and the subsequent determination of the amount of the movement. That is, processing time for determining the detected movement and adjustment of the autofocus window before the second focus image is captured may not exactly correspond. Because of such potential time differences, there may be possible unaccounted-for movement of the image capture device 100, depending upon the embodiment. Therefore, the autofocus window 202 may not be adjusted so that the target object remains "exactly" stationery within the two autofocus windows. That is, because there may be some small amount of error introduced by the unaccounted-for movement associated with focus image capture if the target object, the target object may only be "substantially" stationary within the two autofocus windows.

Figure 6:
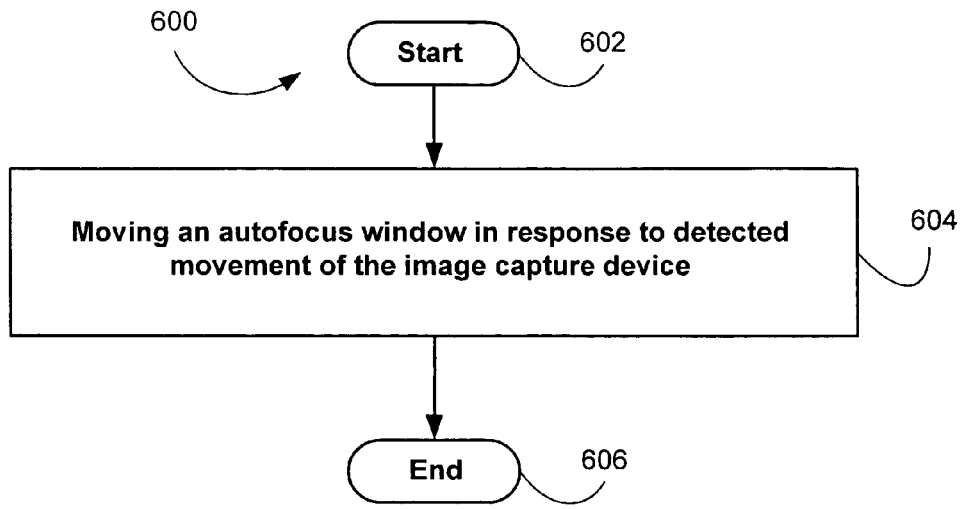
Figure 7:
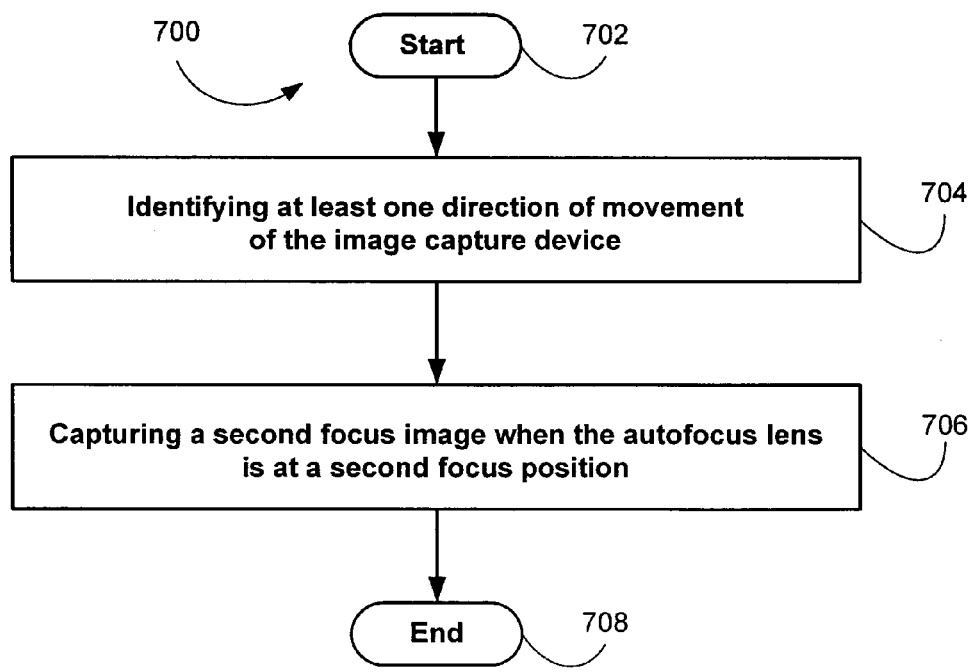

FIGS. 5-7 are flow charts 500, 600 and 700, respectively of various embodiments for focusing an image capture device 100 (FIG. 1). The flow charts 500, 600 and 700 show the architecture, functionality, and operation of a possible implementation of the software for implementing the autofocus applicant 110 (FIG. 1). In this regard, each block may represent a module, segment, or portion of code, which comprises one or more executable instructions for implementing the specified logical function(s). It should also be noted that in some alternative implementations, the functions noted in the blocks may occur out of the order noted in FIGS. 5-7 or may include additional functions. For example, two blocks shown in succession in FIGS. 5-7 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

In one embodiment, the process starts at block 502. At block 504, a first focus image is captured when an autofocus lens 126 is at a first focus position, the first focus image corresponding to an autofocus window 202 that is directed towards a target object upon which the image capture device 100 (FIG. 1) is to focus on. At block 506, movement of the image capture device 100 is detected, the movement occurring between capture of the first focus image and a second focus image. At block 508, position of the autofocus window is adjusted, the adjustment corresponding to the detected movement such that the target object remains stationary within the autofocus window during the detected movement. At block 510, the second focus image is captured when the autofocus lens is at a second focus position. The process ends at block 512.

In another embodiment, the process starts at block 602. At block 604, moving an autofocus window 202 is moved in response to detected movement of the image capture device 100. The process ends at block 606.

In yet another embodiment, the process starts at block 702. At block 704, at least one direction of movement is identified of the image capture device 100. At block 706, position of an autofocus window 202 is shifted in a direction that is opposite to the direction of the image capture device 100 movement. The process ends at block 708.

It should be emphasized that the above-described embodiments are mere examples of possible implementations. Therefore, many variations and modifications may be made to the above-described embodiments. All such modifications and variations are intended to be included herein within the scope of the disclosure.

What is claimed is:

1. A method for focusing an image capture device on an object of interest, comprising:
   capturing a first focus image when an autofocus lens is at a first focus position, the first focus image having an autofocus window that is directed towards a target object upon which the image capture device is to focus on;
   detecting movement of the image capture device, the movement occurring between capture of the first focus image and a second focus image;
   discriminating the movement of the image capture device between intended movement and unintended movement;
   adjusting a position of the autofocus window while maintaining a corresponding number of pixels of the autofocus window based on discriminating between the intended movement and the unintended movement, the adjustment always being opposite to the detected movement such that the target object remains stationary within the autofocus window during the detected movement, the adjustment being only in response to unintended movement of the image capture device;
   re-centering the autofocus window when the movement of the image capture device is the intended movement;
   capturing a second focus image when the autofocus lens is at a second focus position;
   identifying at least one direction of movement of the image capture device;
   determining a direction that is opposite in direction to the movement direction of the image capture device without any user-input; and
   shifting the position of the autofocus window in the direction that is opposite in direction to the direction of the image capture device movement to define the second focus image; and
   wherein the autofocus window automatically and continuously moves back toward a center of an image capture region, while the direction of the image capture device still follows movement of the autofocus window on the image capture region, the movement on the image capture region is quicker than the autofocus window moving back toward the center of the image capture region.

2. The method of claim 1, wherein the target object remains substantially stationary within the autofocus window during the detected movement.

3. The method of claim 1, further comprising determining a first focus metric derived from the first focus image and a second focus metric derived from the second focus image.

4. The method of claim 1, further comprising:
   determining a focus position for the autofocus lens; and
   adjusting the autofocus lens so that the object of interest is focused for image capture.

5. The method of claim 1, further comprising:
   receiving image data from a first group of pixels residing in a photosensor that captures an image of the target object, the first group of pixels corresponding to the first focus image;
   determining a second group of pixels based upon the detected movement wherein the second group of pixels corresponds to the second focus image; and
   receiving the image data from the second group of pixels.

6. The method of claim 5, wherein the first group of pixels and the second group of pixels reside in the photosensor that captures the image of the object of interest.

7. The method of claim 1, further comprising:
   identifying at least one direction of movement of the image capture device; and
   shifting position of the autofocus window in a direction that is opposite in magnitude to the direction of the image capture device movement to define the second focus image.

8. The method of claim 7, wherein the shifting position of the autofocus window further comprises shifting position of the autofocus window in the direction that is a fraction of the magnitude of the direction of the image capture device movement.

9. The method of claim 1, further comprising focusing an image capture device lens based upon the shifted autofocus window.

10. The method of claim 1, further comprising:
    receiving information from at least one sensor that detects the movement of the image capture device; and
    processing the received information to determine the movement of the image capture device.

11. The method of claim 1, further comprising:
    capturing a first image;
    capturing a second image;
    comparing the first image with the second image; and
    determining the movement of the image capture device based upon at least one difference between the compared first image and second image.

12. The method of claim 11, wherein determining the movement is based upon a correlation function between the first image and the second image.

13. The method of claim 1, further comprising:
    capturing a plurality of focus images when the autofocus lens is at a corresponding plurality of different focus positions, the plurality of focus images having the autofocus window;
    detecting the movement of the image capture device as the plurality of focus images are captured; and
    adjusting position of the autofocus window as the plurality of focus images are captured, the adjustments corresponding to the detected movement such that the target object remains stationary within the autofocus window during the detected movement and while the plurality of focus images are captured.

14. The method of claim 1, further comprising:
capturing a first plurality of focus images when the autofocus lens is at the first focus position, the first plurality of focus images having a corresponding plurality of autofocus windows that are directed towards at least an object upon which the image capture device is to focus on;
detecting the movement of the image capture device, the motion occurring between capture of the first focus image and the second focus image;
adjusting the position of the plurality of autofocus windows, the adjustment corresponding to the detected movement such that the object remains stationary within the plurality of autofocus windows during the detected movement;
capturing a second plurality of focus images when the autofocus lens is at the second focus position; and
selecting one of the first plurality of focus images and a corresponding one of the second plurality of focus images to determine focus.

15. The method of claim 1, wherein detecting the movement further comprises generating a motion vector from successive focus images using a video compression algorithm.

16. The method of claim 15, wherein generating the motion vector further comprises generating the motion vector from a moving picture experts group (MPEG) video compression algorithm.

17. The method of claim 1, wherein discriminating is based on frequency of the detected movement.

18. The method of claim 1, wherein intended movement is from following a moving subject, and unintended movement is from hand shake.

* * * * *